F. C. GILLITT.
CLAMP.
APPLICATION FILED SEPT. 24, 1909.

971,438.

Patented Sept. 27, 1910.

Witnesses

Inventor
Fred C. Gillitt.
By Victor J. Evans.
Attorney

UNITED STATES PATENT OFFICE.

FREDRIC C. GILLITT, OF HASTINGS, MINNESOTA.

CLAMP.

971,438. Specification of Letters Patent. Patented Sept. 27, 1910.

Application filed September 24, 1909. Serial No. 519,495.

*To all whom it may concern:*

Be it known that I, FREDRIC C. GILLITT, a citizen of the United States, residing at Hastings, in the county of Dakota and State of Minnesota, have invented new and useful Improvements in Clamps, of which the following is a specification.

This invention is an improved hook clamp especially adapted to be attached to a cross-beam of a porch or other structure and for use for suspending a swing, a hanging basket or other object or device, the object of the invention being to provide an improved suspending hook which may be readily attached to a supporting beam or other object without the necessity of boring a hole in said beam or other object, without the necessity of employing pawls for attaching the hook clamp and without danger of marring the surface of or injuring the beam or other object to which the hook clamp is attached.

The said invention consists in the construction, combination and arrangements of devices hereinafter described and claimed.

Figure 1:
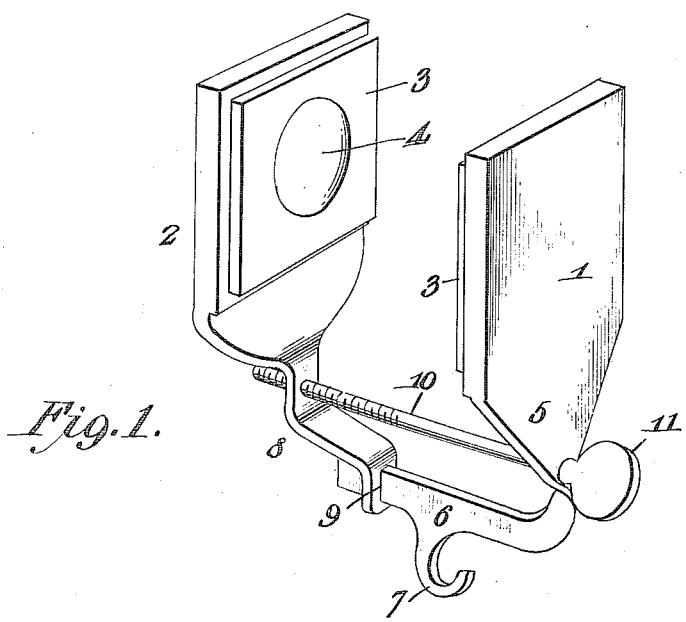
Figure 2:
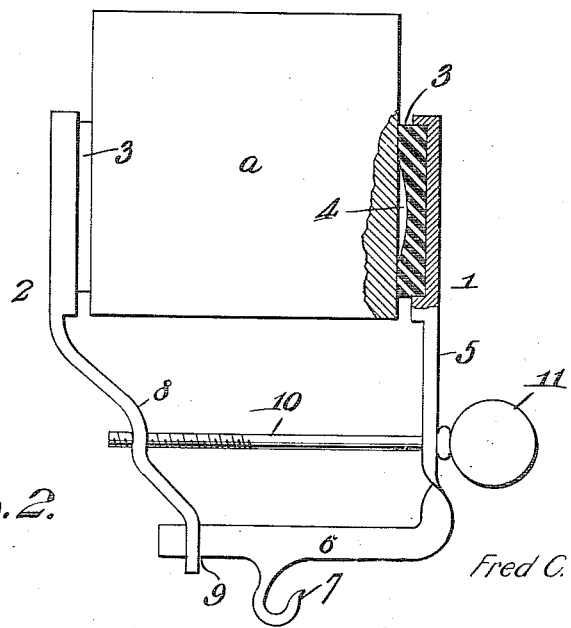

In the accompanying drawings, Figure 1 is a perspective view of a hook clamp constructed in accordance with my invention. Fig. 2 is partly a side elevation and partly sectional view of the same showing the hook clamp attached to a beam.

My improved hook clamp has a pair of jaw members 1, 2 each of which has a recess on its inner side at its upper end for the reception of the pad or cushion 3, said pads or cushions being made of rubber or other suitable elastic material and presenting concave faces 4 for engagement with the opposite sides of a supporting object such as a beam *a* or the porch or other structure. The jaw 1 has a depending arm 5 at the lower end of which is a bar 6 the said bar having a hook 7 or other analogous device adapted for the attachment of a chain, rope, ring or like element. The jaw 2 also has a depending arm 8 which is here shown as inclining inwardly toward the arm 5 of the jaw 1 and the said arm 8 has near its lower end an opening 9 for the reception of the bar 6 so that the said bar 6 and the said arm 8 form a slidable connection between the jaw members 1, 2 so that said jaw members may be moved toward or from each other as may be required. An adjusting and clamping screw 10 passes through an opening in the arm 5 of the jaw member 1 and has its threaded portion in engagement with a threaded opening in the arm 8 of the jaw member 2. Said adjusting and clamping screw has a flattened head 11 at its outer end whereby it may be readily turned to clamp the cushions or pads of the jaw members on opposite sides of a beam or other supporting object or release the same therefrom as will be understood.

It will be obvious from the foregoing description that owing to the provision of the pads or cushions my improved clamp hook may be attached to a supporting device without injury to the latter and without marring its surfaces.

Having thus described the invention, what is claimed as new is:—

A clamp hook comprising a pair of rectangular-shaped jaw members having their opposed inner faces countersunk, cushions arranged in the said countersunks, one of said jaw members being provided on its lower side with an arm, a portion of which inclines downwardly and beyond the plane of the inner face of the jaw and ends in a vertical downward extension having a threaded opening, the said extension terminating in a downwardly inclined extension having adjacent to its center a slot, the other of said jaws being provided on its lower side with an arm, a portion of which extends vertically downward and is provided with an opening to aline with the screw-threaded opening, the said downwardly extending portion terminating in a bent portion extending beyond the inner face of the second-named jaw and insertible into the said slot, a hook depending from the said bent portion, and a clamping screw passing through said openings.

In testimony whereof I affix my signature in presence of two witnesses.

FREDRIC C. GILLITT.

Witnesses:
W. E. SCOTT,
T. S. RYAN.